United States Patent
Perly et al.

[11] Patent Number: 6,024,879
[45] Date of Patent: Feb. 15, 2000

[54] WATER PURIFICATION USING CYCLODEXTRINS

[75] Inventors: Bruno Perly, La Verrilis; Cécile Baudin, Paris; Pascal Gosselin, Vallon-sur-Gée, all of France

[73] Assignee: Commissariat a l'Energie Atomique, France

[21] Appl. No.: 09/269,933

[22] PCT Filed: Oct. 27, 1997

[86] PCT No.: PCT/FR97/01920

§ 371 Date: Jul. 2, 1999

§ 102(e) Date: Jul. 2, 1999

[87] PCT Pub. No.: WO98/18722

PCT Pub. Date: May 7, 1998

[30] Foreign Application Priority Data

Oct. 28, 1996 [FR] France .................................. 96 13126

[51] Int. Cl.[7] .................................................. B01D 15/08
[52] U.S. Cl. .......................... 210/635; 656/679; 656/691
[58] Field of Search .................................. 210/635, 656, 210/679, 691, 692, 690, 908

[56] References Cited

U.S. PATENT DOCUMENTS

| | | | |
|---|---|---|---|
| Re. 36,092 | 2/1999 | Konig | 210/635 |
| 4,426,292 | 1/1984 | Wernick | 210/635 |
| 4,726,905 | 2/1988 | Friedman | 210/692 |
| 4,781,858 | 11/1988 | Mizukami | 210/635 |
| 5,064,944 | 11/1991 | Armstrong | 210/502.1 |
| 5,104,547 | 4/1992 | Cabrera | 210/656 |
| 5,137,687 | 8/1992 | Dunson | 210/916 |
| 5,154,738 | 10/1992 | Armstrong | 210/635 |
| 5,190,663 | 3/1993 | Fetzer | 210/674 |
| 5,198,429 | 3/1993 | Konig | 210/635 |
| 5,505,843 | 4/1996 | Obuchi | 210/94 |
| 5,639,824 | 6/1997 | Okamoto | 210/656 |
| 5,772,876 | 6/1998 | Murakami | 210/198.2 |

*Primary Examiner*—Ernest G. Therkorn
*Attorney, Agent, or Firm*—Burns, Doane, Swecker & Mathis, L.L.P.

[57] ABSTRACT

The invention relates to a process for the purification of water with a view to separating therefrom at least one organic substance, particularly olfactory pollutants such as (−)geosmine and (+)2-methyl-isoborneol.

This process consists of contacting the water to be purified with a cyclodextrin of formula:

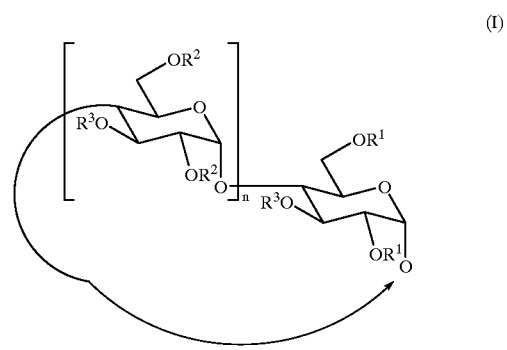

in which $R^1$ represents a hydrogen atom, a $C_1$ to $C_{12}$ alkyl group or the acetyl group $CH_3CO$—, $R^2$ and $R^3$, which can be the same or different, represent H or $R^1$, and n=5, 6 or 7, in order to include therein the organic substance or substances to be separated and separating the purified water from the cyclodextrin.

16 Claims, 1 Drawing Sheet

WATER PURIFICATION USING CYCLODEXTRINS

TECHNICAL FIELD

The invention relates to a process for the purification of water with a view to the separation therefrom of organic substances, particularly malodorous substances.

It more particularly applies to the elimination of natural pollutants constituted by (−)geosmine and (+)2-methyl-isoborneol.

These pollutants are organic substances produced by bioconversion of organic matter and are known as being natural pollutants of drinking water. In water reprocessing plants, these are the main olfactory pollutants contributing to a significant extent to the smell and taste of fusty soil in polluted water. These substances comply with the following formulas:

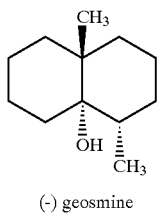

(−) geosmine

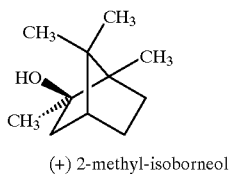

(+) 2-methyl-isoborneol (−)geosmine and (+)2-methyl-isoborneol are detected by human smell with a very small dose. For example, geosmine is detected in air at a rate of 0.1 ppb.

PRIOR ART

Numerous methods have been tested for eliminating these two pollutants, which are often only present in doses around 130 to 180 ng/l.

The tested methods make use of adsorption procedures, e.g. of activated carbon, lipid membrane, zeolite or divinyl benzene-styrene copolymer, filtration procedures on sand or gravel, decomposition processes by oxidation by means of ozone and/or hydrogen peroxide, or elimination by microorganisms.

Hitherto, none of the said methods, used alone, has been completely satisfactory. Recently consideration has been given to combining several procedures for eliminating these pollutants.

Thus, Koizumi et al described in Zosui Gijutsu, 18 (1), 56–60, 1992: Chemical abstract 117 (20), No. 198092 g, a process for completely eliminating 2-methyl-isoborneol from water by oxidation by means of ozone and adsorption of the oxidation products by activated carbon.

Vik et al described in Water Sci. Technol., 20 (8–9), pp 229–36, 1988: Chemical abstract 110 (10), No. 82177q, a process for eliminating geosmine and 2-methyl-isoborneol from water by oxidation by means of ozone, followed by adsorption on activated carbon.

Destailleur et al in J. Fr. Hydrol., 22 (2), pp 225–34, 1991: Chemical abstract 118 (6), No. 45353p, described a process for eliminating geosmine from water by oxidation by means of ozone and hydrogen peroxide.

DESCRIPTION OF THE INVENTION

The present invention relates to a process for purifying water making it possible to eliminate malodorous organic substances, such as geosmine and 2-methyl-isoborneol, by a different method, which is easy to put into operation and very effective, which uses a cyclodextrin able to form an inclusion complex with these substances.

Cyclodextrins or cyclomaltooligosaccharides are compounds having a natural origin formed by the linkage of α-1,4-bonded glucose units. Numerous works have shown that these compounds could form inclusion complexes with hydrophobic molecules, thus permitting their solubilization in aqueous media. Numerous applications have been developed in order to take advantage of this phenomenon, especially in the pharmaceutical field. Thus, JP-A-62/123196, proposes the use of the dimethyl derivative of β-cyclodextrin for solubilizing prednisolone. WO-A-91/04026 proposes using the dimethyl derivative of β-cyclodextrin for solubilizing pharmaceutical agents such as Amiodarone, Melphalam and Naproxen.

However, the use of cyclodextrins for trapping pollutants and purifying water has never been envisaged.

According to the invention, the water purification process for separating from water at least one organic substance comprises the stages consisting of:

contacting the water to be purified with a cyclodextrin of formula:

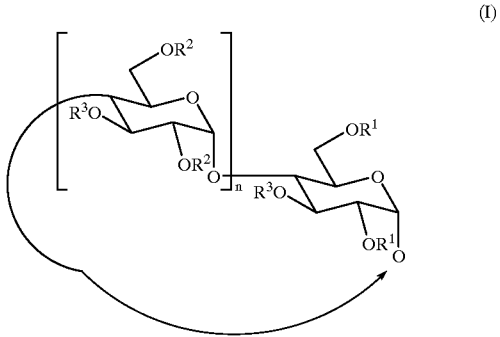

(I)

in which $R^1$ represents a $C_1$ to $C_{12}$ alkyl group or the acetyl group $CH_3CO$—, $R^2$ and $R^3$ which can be the same or different, represent H or $R^1$, $R^2$ and/or $R^3$ can differ from the other $R^2$ and $R^3$ in at least one glucose unit of the cyclodextrin, and n=5, 6 or 7 for including therein the organic substance or substances to be separated and separating the purified water from the cyclodextrin.

The cyclodextrin of formula (I) used in the invention for the purification of water can either be a disubstituted derivative ($R^3$=H) of natural cyclodextrin, or a trisubstituted derivative ($R^3$ having in this case the same meaning as $R^1$) of natural cyclodextrin. In addition, said derivatives can be disubstituted or trisubstituted on one or more glucose units of the cyclodextrin and have different substituents in at least one glucose unit. Use is preferably made of a cyclodextrin derivative having the same substitutions on all glucose units.

When the $R^1$ group represents an alkyl group, it can be a straight or branched alkyl group with 1 to 12 carbon atoms. Preference is given to the use of the methyl or ethyl group. According to a preferred embodiment of the invention, the cyclodextrin derivative is the disubstituted derivative, $R^2$ having the same meaning as $R^1$ and $R^3$ representing a hydrogen atom. In this case, $R^1$ and $R^2$ are e.g. the methyl group.

It is also possible to obtain very good results using trisubstituted cyclodextrin derivatives in which $R^1$, $R^2$ and $R^3$ have the same meaning and preferably represent the methyl group.

The use of cyclodextrins of formula (I) for the purification of water offers numerous advantages.

Thus, the special properties of cyclodextrins make it possible to separate organic substances from water by inclusion of said substances in the hydrophobic cavity of the cyclodextrins, without any covalent bond being established.

The trapping of these polluting substances is immediate and total as long as the number of cyclodextrin molecules exceeds that of the polluting substances.

In addition, this inclusion is irreversible and has no destructive character with respect to the cyclodextrin molecule. Therefore the water purification process is easy to perform and is inexpensive, cyclodextrins not being onerous raw materials.

In addition, the complexes obtained by inclusion of the polluting substance in the cyclodextrin derivative are more soluble in water than those obtained with natural cyclodextrins.

The water types which can be purified by the process according to the invention can be drinking or industrial water or aqueous effluents containing few organic substances so as to permit the total trapping of the malodorous, polluting substances.

According to a variant of the process according to the invention, use is made of a natural cyclodextrin, i.e. complying with the aforementioned formula (I) with $R^1=R^2=R^3=H$, in order to separate a polluting substance chosen from among (−)geosmine and (+)2-methyl-isoborneol. Preference is given to the use of β-cyclodextrin (n=6).

The cyclodextrin derivatives usable in the invention can be prepared by conventional processes. Thus, when $R^1$ and $R^2$ represent the same alkyl group and $R^3$ represents H, the corresponding derivative can be obtained according to the operating procedure described in Helvetica Chimica Acta, 61, 1978, p 2215. When $R^1$, $R^2$ and $R^3$ represent the same alkyl group, the derivative can be obtained by reacting NaH with natural cyclodextrin and adding alkyl iodide to the corresponding alkoxide.

When the $R^1$ group is an acetyl group, it is possible to obtain these derivatives by reacting the corresponding natural cyclodextrin with acetic anhydride.

For using the cyclodextrin of formula (I) for the purification of water, it is advantageous to irreversibly fix it to a solid support in order to easily bring about the contacting of the water with the cyclodextrin, followed by its separation.

Thus, the process according to the invention can be performed in a chromatographic column by circulating the water within a column filled with an inert support, to which is fixed the cyclodextrin of formula (I), and collecting the purified water at the outlet from said column.

Silica is an example of the usable solid supports.

Thus, numerous methods exist for chemically fixing cyclodextrins to silica. This fixing can be performed by means of one or more spacing arms constituted by a hydrocarbon chain containing 2 to 20 carbon atoms and optionally oxygen atoms intercalated between the carbon atoms. The bond with the solid support can be brought about at one of the ends of the spacing arms in the form of a covalent bond by means of amide or amine functions, or by bonds containing no nitrogen, such as silane bonds. The spacing arm can be chemically fixed at its other end to one of the $OR^2$ groups of the cyclodextrin of formula (I) by an ether bond, i.e. by replacing $R^2$ by the spacing arm. U.S. Pat. No. 4,539,399 describes a method for fixing to silica by bonds containing no nitrogen atom. Fixing methods using amide or amine functions are described in the work entitled "New Trends in Cyclodextrins and Derivatives", Dominique Duchêne, Edition de Santé, 1991, p 520.

Other features and advantages of the invention can be gathered from studying the following description of examples given in an illustrative and non-limitative manner and with reference to the attached drawings.

EXAMPLE 1

7.98 mg of the dimethyl derivative of -cyclodextrin, i.e. the derivative of formula (I) with $R^1=R^2=CH_3$, $R^3=H$ and n=6, are dissolved in 0.4 ml of heavy water in order to obtain a 15 mM solution. This solution is analyzed by nuclear magnetic resonance NMR. The spectrum obtained is shown in FIG. 1.

This is followed by the dissolving of 79.8 mg of the same dimethyl derivative of β-cyclodextrin in 3.99 ml of heavy water, to which are added 11 mg of (−)geosmine, in order to obtain an equimolecular solution in each of the two compounds (15 mM).

This solution also undergoes analysis by nuclear magnetic resonance. The spectrum obtained under these conditions is shown in FIG. 2.

Figure 1:
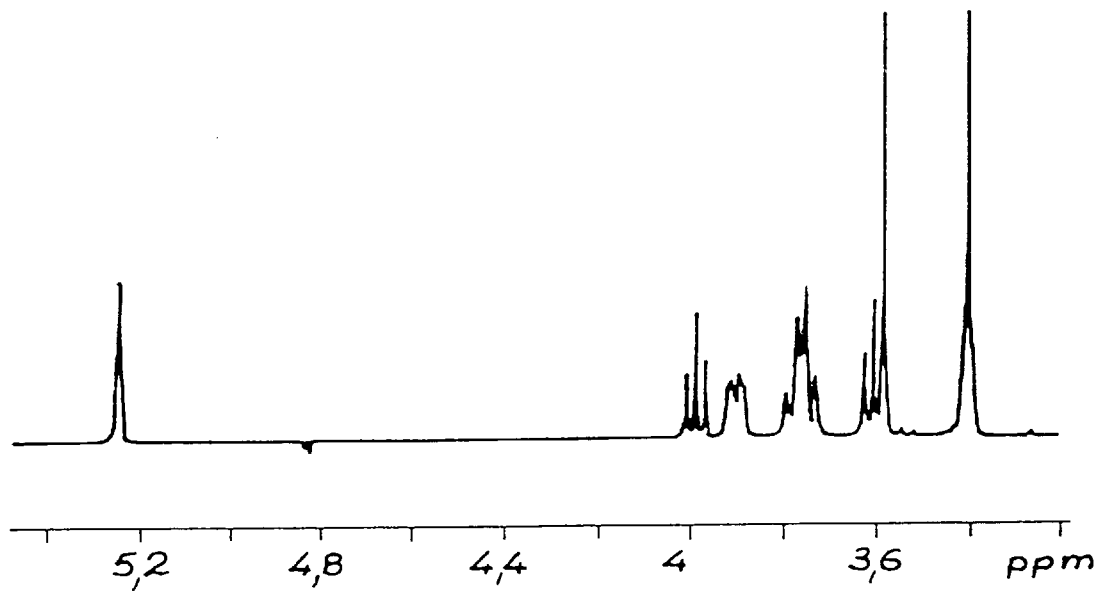
FIG. 1 is a nuclear magnetic resonance spectrum of the dimethyl derivative of β-cyclodextrin.
Figure 2:
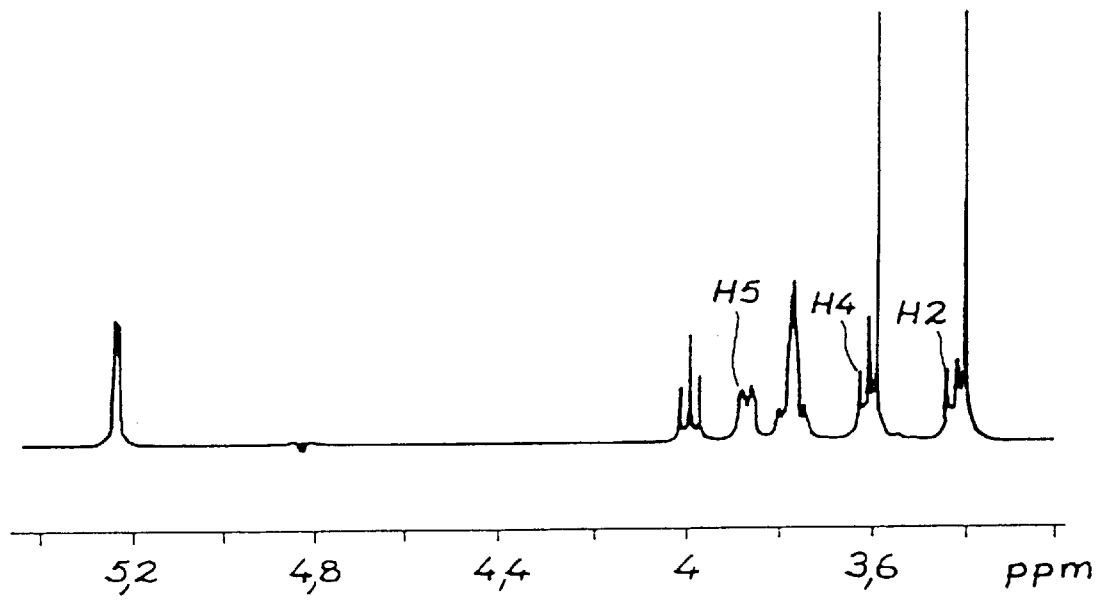
FIG. 2 is a nuclear magnetic resonance spectrum of the dimethyl derivative of β-cyclodextrin in the presence of geosmine.

On comparing the spectra of FIGS. 1 and 2, it can be seen that the modifications of the chemical shifts corresponding to the proton $H_2$, $H_4$ and $H_5$ show that there is an inclusion of geosmine in the dimethyl derivative of β-cyclodextrin.

EXAMPLE 2

Weighing takes place of 79.8 mg of the dimethyl derivative of β-cyclodextrin used in example 1 and 10.1 mg of methyl-isoborneol, which is dissolved in heavy water in order to obtain an equimolecular solution (15 mM) of the two compounds.

Analysis takes place by nuclear magnetic resonance, as in example 1. The NMR spectrum obtained under these conditions shows that there is inclusion of methyl-isoborneol in the dimethyl derivative of β-cyclodextrin.

EXAMPLE 3

This examples follows the same operating procedure as in example 1, but use is made of 68.1 mg of natural β-cyclodextrin for 4 ml of heavy water.

A comparison of the NMR spectra of natural β-cyclodextrin in the absence and presence of 11 mg of geosmine and 10.1 mg of 2-methyl-isoborneol shows that there is an inclusion of said pollutants in the β-cyclodextrin.

EXAMPLE 4

This example follows the same operating procedure as in example 1, but using 85.8 mg of permethyl derivative of β-cyclodextrin ($R^1=R^2=R^3=CH_3$ and n=6) for 4 ml of heavy water.

A comparison of the NMR spectra in the absence and presence of 11 mg of geosmine or 10.1 mg of 2-methyl-isoborneol shows that there is an inclusion of these pollutants in the permethyl derivative of β-cyclodextrin.

EXAMPLE 5

This example follows the same operating procedure as in example 1, but using 73.5 mg of the permethyl derivative of α-cyclodextrin (cyclodextrin of formula (I) with $R^1=R^2=R^3=CH_3$ and n=5) in 4 ml of heavy water.

A comparison of the NMR spectra of this derivative in the absence and presence of 10 mg of geosmine or 10.1 mg of 2-methyl-isoborneol shows that there is an inclusion of these pollutants.

EXAMPLE 6

This example follows the operating procedure of example 1, but using 97.98 mg of the permethyl derivative of γ-cyclodextrin (cyclodextrin of formula (I) with $R^1=R^2=R^3=CH_3$ and n=7) for 4 ml of heavy water.

A comparison of the NMR spectra of this compound in the absence and presence of 11 mg of geosmine or 10.1 mg of 2-methyl-isoborneol shows that there is an inclusion of these pollutants.

EXAMPLE 7

This example involves the purification of a drinking water containing traces of (−)geosmine and (+)2-methyl-isoborneol on a column filed with silica gel, to which is fixed the dimethyl derivative of β-cyclodextrin (cyclodextrin of formula (I) with $R^1=R^2=CH_3$, $R^3=H$ and n=6).

This fixing takes place in accordance with the method described in U.S. Pat. No. 4,539,399 by means of a spacing arm of formula:

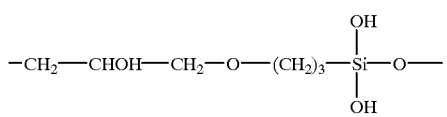

replacing one of the R of the cyclodextrin, the Si—O silane bonds being established with the silica gel.

At the column outlet is obtained a drinking water no longer containing (−)geosmine and (+)2-methyl-isoborneol detectable by human smell.

We claim:

1. Process for the purification of water with a view to separating therefrom at least one organic substance and comprising the stages consisting of:

contacting the water to be purified with a cyclodextrin of formula:

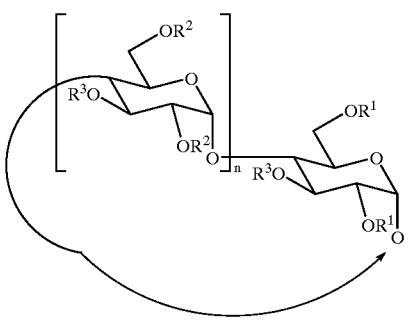

(I)

in which $R^1$ represents a $C_1$ to $C_{12}$ alkyl group or the acetyl group $CH_3CO$—, $R^2$ and $R^3$, which can be the same or different, represent H or $R^1$, $R^2$ and/or $R^3$ can differ from the other $R^2$ and $R^3$ in at least one glucose unit of the cyclodextrin, and n=5, 6 or 7, for including in the latter the organic substance or substances to be separated and separating the purified water from the cyclodextrin.

2. Process according to claim 1, characterized in that the organic substance is a malodorous substance chosen from among (−)geosnine and (+)methyl-isoborneol.

3. Process according to claim 1, characterized in that $R^1$ represents the methyl group.

4. Process according to claim 3, characterized in that $R^2$ represents the methyl group and $R^3$ represents H.

5. Process according to claim 1, characterized in that $R^1$, $R^2$ and $R^3$ represent the methyl group.

6. Process according to claim 1, characterized in that n=6.

7. Process according to claim 1, wherein the cyclodextrin of formula (1) is irreversibly fixed to a solid support.

8. Process according to claim 7, characterized in that the solid support is silica.

9. Process according to claim 7, wherein the cyclodextrin is fixed to the solid support by means of a hydrocarbon chain with 2 to 20 carbon atoms replacing at least one of the $R^2$ of the cyclodextrin and bonded to the solid support by a covalent bond.

10. Process according to claim 7, wherein the solid support is placed in a column and the water is made to circulate in the column in order to collect the purified water at the column outlet.

11. Process for the purification of water with the view to the separation therefrom of at least one organic substance chosen from among (−)geosnine and (+)2-methyl-isoborneol, comprising stages consisting of:

contacting the water to be purified with a cyclodextrin of formula:

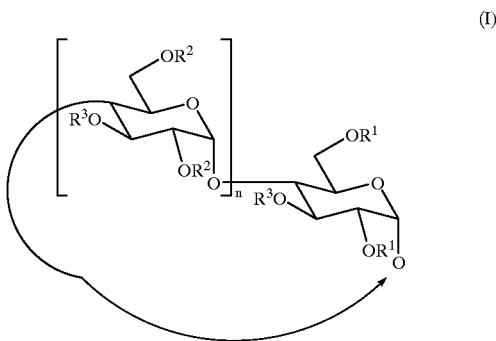

(I)

in which $R^1$, $R^2$ and $R^3$ represent a hydrogen atom and n=5, 6 or 7, in order to include therein the organic substance or substances to be separated and separating the purified water from the cyclodextrin.

12. Process according to claim 11, characterized in that n=6.

13. Process according to claim 11, wherein the cyclodextrin of formula (I) is irreversibly fixed to a solid support.

14. Process according to claim 13, characterized in that the solid support is silica.

15. Process according to claim 13, wherein the cyclodextrin is fixed to the solid support by means of a hydrocarbon chain with 2 to 20 carbon atoms replacing at least one of the $R^2$ of the cyclodextrin and bonded to the solid support by a covalent bond.

16. Process according to claim 13, wherein the solid support is placed in a column and the water is made to circulate in the column in order to collect the purified water at the column outlet.

* * * * *